United States Patent
David

(10) Patent No.: US 7,717,219 B2
(45) Date of Patent: May 18, 2010

(54) UNITARY REAR FRAME FOR MOUNTING ENGINE, HYDROSTATIC TRANSMISSION, AND OTHER COMPONENTS TO MOWER

(75) Inventor: Michael David, Fuquay-Varina, NC (US)

(73) Assignee: Deere & Company, Moline, IL (US)

( * ) Notice: Subject to any disclaimer, the term of this patent is extended or adjusted under 35 U.S.C. 154(b) by 356 days.

(21) Appl. No.: 11/759,363

(22) Filed: Jun. 7, 2007

(65) Prior Publication Data

US 2008/0302076 A1    Dec. 11, 2008

(51) Int. Cl.
*B60K 5/12* (2006.01)

(52) U.S. Cl. ........................ 180/291; 180/305; 180/312; 280/756

(58) Field of Classification Search .................. 280/756; 180/305, 307, 308, 291, 311, 312, 900
See application file for complete search history.

(56) References Cited

U.S. PATENT DOCUMENTS

| | | | |
|---|---|---|---|
| 3,002,782 A | 10/1961 | Jahn | |
| 4,726,440 A | 2/1988 | Kamlukin et al. | |
| 4,787,646 A * | 11/1988 | Kamlukin et al. | 280/124.113 |
| 4,807,904 A * | 2/1989 | Kamlukin et al. | 280/781 |
| 5,809,756 A * | 9/1998 | Scag et al. | 56/10.8 |
| 5,839,758 A * | 11/1998 | Finch et al. | 280/756 |
| 6,237,952 B1 * | 5/2001 | Burckhartzmeyer et al. | 280/756 |
| 6,434,917 B1 | 8/2002 | Bartel | |
| 6,550,563 B2 * | 4/2003 | Velke et al. | 180/333 |
| 6,973,783 B1 * | 12/2005 | Hauser et al. | 60/484 |
| 7,455,132 B2 * | 11/2008 | Acharya et al. | 180/53.4 |
| 2002/0035825 A1 | 3/2002 | Swartzendruber | |

FOREIGN PATENT DOCUMENTS

WO    01/83283    11/2001

* cited by examiner

*Primary Examiner*—Brian Swenson
*Assistant Examiner*—John D Walters

(57) ABSTRACT

A unitary rear frame mounting an engine and hydrostatic transmissions to the rear of a ZTR mower is disclosed. The unitary rear frame includes a lower mounting surface supporting the engine, an upper mounting surface above and forward of the lower mounting surface; a wall extending between the upper and lower mounting surfaces; and a pair of integral side panels depending downwardly from the upper mounting surface and extending forwardly of the wall. Each side panel may have a side pocket for mounting a hydrostatic transmission thereto.

14 Claims, 3 Drawing Sheets

UNITARY REAR FRAME FOR MOUNTING ENGINE, HYDROSTATIC TRANSMISSION, AND OTHER COMPONENTS TO MOWER

FIELD OF THE INVENTION

This invention relates to grass mowing machines, and specifically to mowers having rear mounted engines such as zero turning radius ("ZTR") mowers with independently powered left and right drive wheels controlled with hydrostatic transmissions.

BACKGROUND OF THE INVENTION

Grass mowing machines such as ZTR mowers may have internal combustion engines mounted at the rear of the mower frame or platform behind the operator seat. ZTR mowers also have at least one independently powered drive wheel on each side of a frame. Hydrostatic transmissions transmit power from the engine to each of the left and right drive wheels, either in forward or reverse. The pair of hydrostatic transmissions, or dual hydrostatic transmission, may be driven through a belt and pulley arrangement by the engine crankshaft. The hydrostatic transmission(s) may be mounted to the rear of the vehicle frame adjacent the engine, under and/or behind the operator seat. For example, the hydrostatic transmission(s) may be bolted to mounting plates that are welded to the frame or engine mounting platform. Other rear mounted components, such as a roll over protection system ("ROPS"), also may be welded or attached with bolts to brackets fastened to the frame behind the operator seat.

The mounting plates and structures used for mounting the engine and other components to the rear of the mower frame are labor intensive to weld, fabricate and inspect due to the high number of parts that go into the assembly. They require a large number of welds to securely connect together the engine platform, supporting panels, and brackets. It would be desirable to simplify the mounting structures for the engine and hydrostatic transmission(s) on the rear of a ZTR mower. It would be desirable to provide a low cost mounting structure for the engine and hydrostatic transmission on a ZTR mower. It would be desirable to reduce the amount of labor to mount an engine, hydrostatic transmission and other components on the rear of a ZTR mower.

SUMMARY OF THE INVENTION

A unitary rear frame mounting an engine, hydrostatic transmission and other components on the rear of a ZTR mower is provided. The unitary rear frame may include a stamped sheet metal body having horizontal mounting surfaces, and side panels depending downwardly from the horizontal mounting surfaces. Each of the horizontal mounting surfaces and side panels have mating holes for insertion of threaded fasteners to mount the engine and hydrostatic transmissions as an unwelded one piece rear assembly

DESCRIPTION OF THE PREFERRED EMBODIMENT

Figure 1:
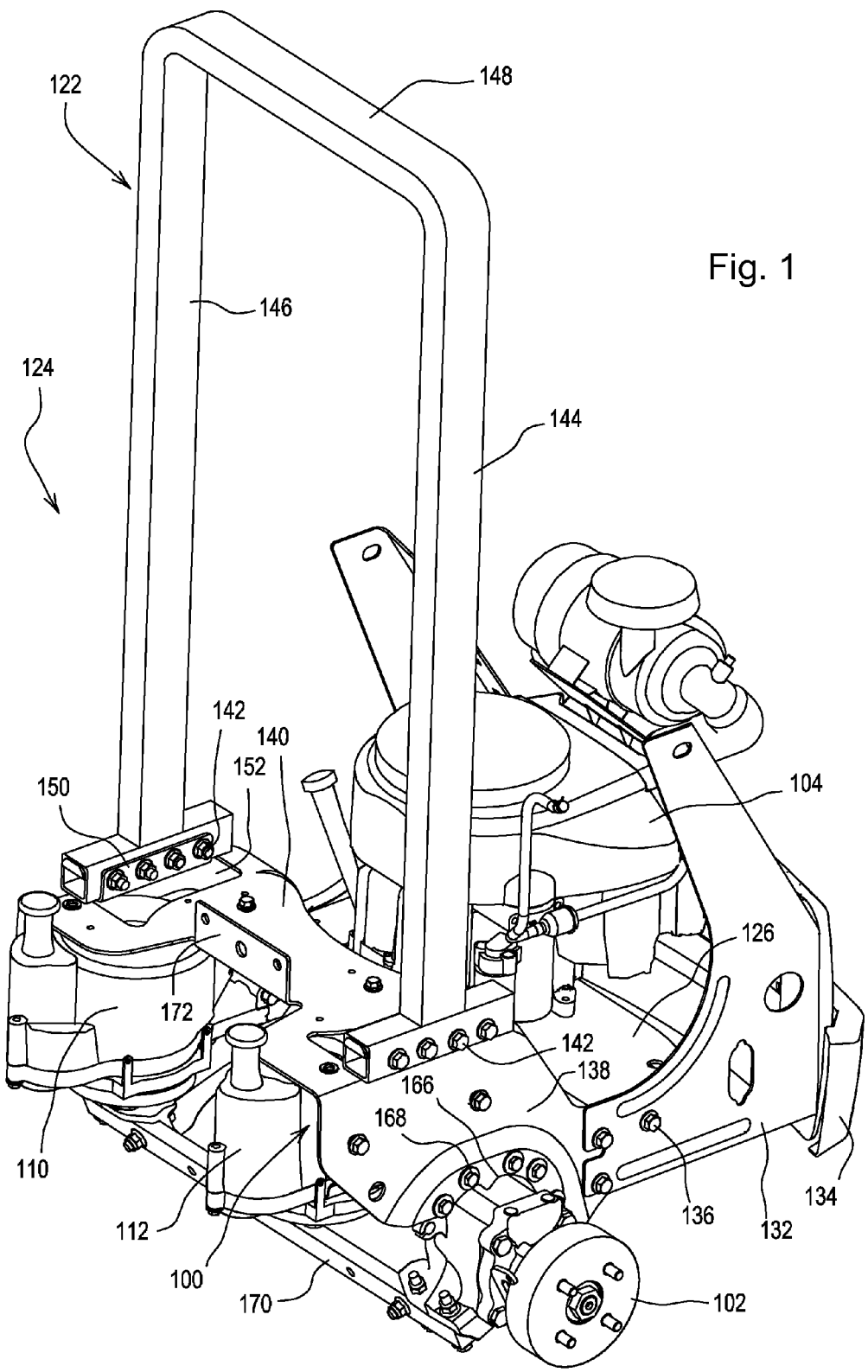
FIG. 1 is a perspective view of a unitary rear frame on which an engine, pair of hydrostatic transmissions and roll over protection system are mounted.
Figure 2:
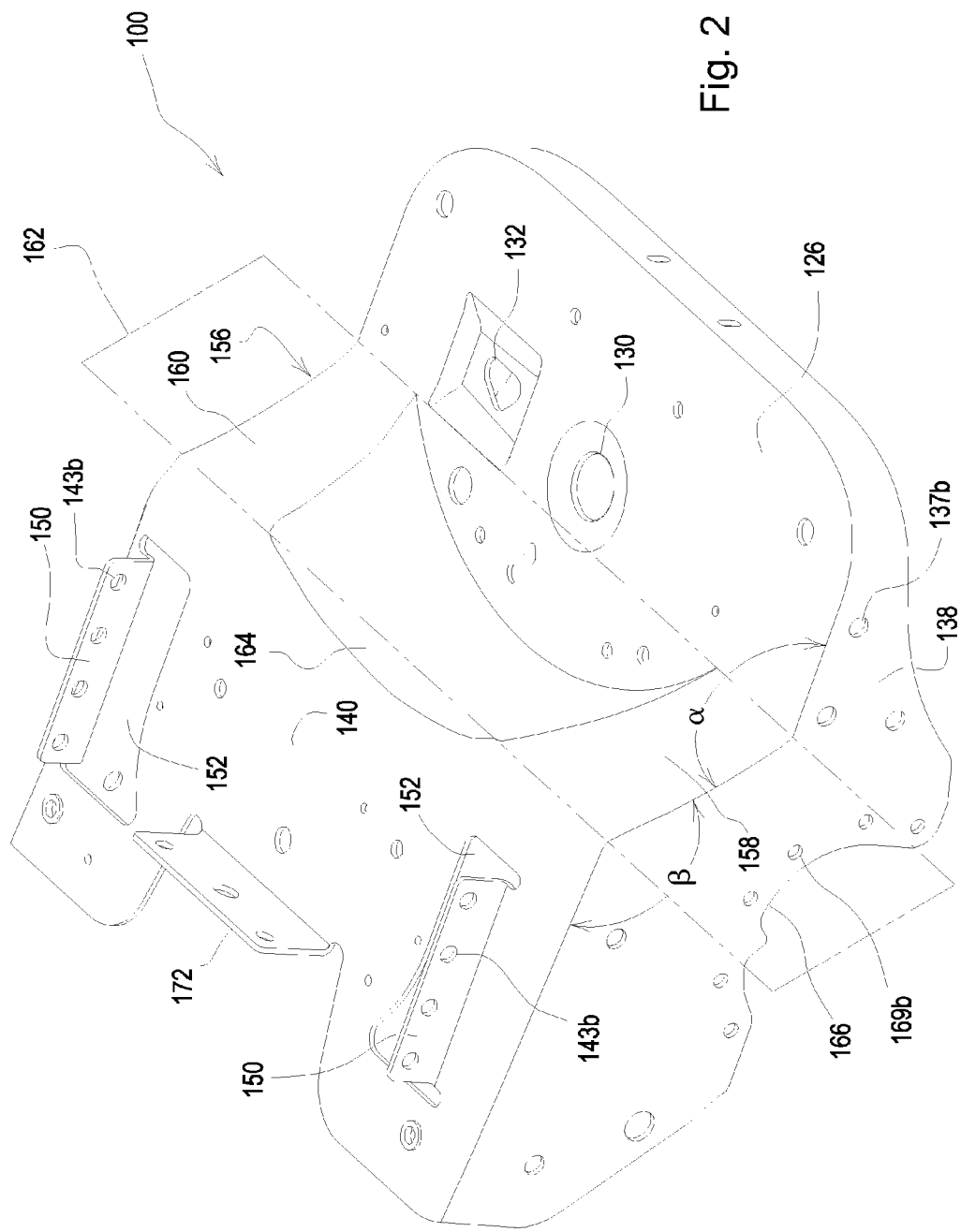
FIG. 2 is a perspective view of a unitary rear frame for mounting an engine, pair of hydrostatic transmissions and roll over protection system to the rear of a ZTR mower.
Figure 3:
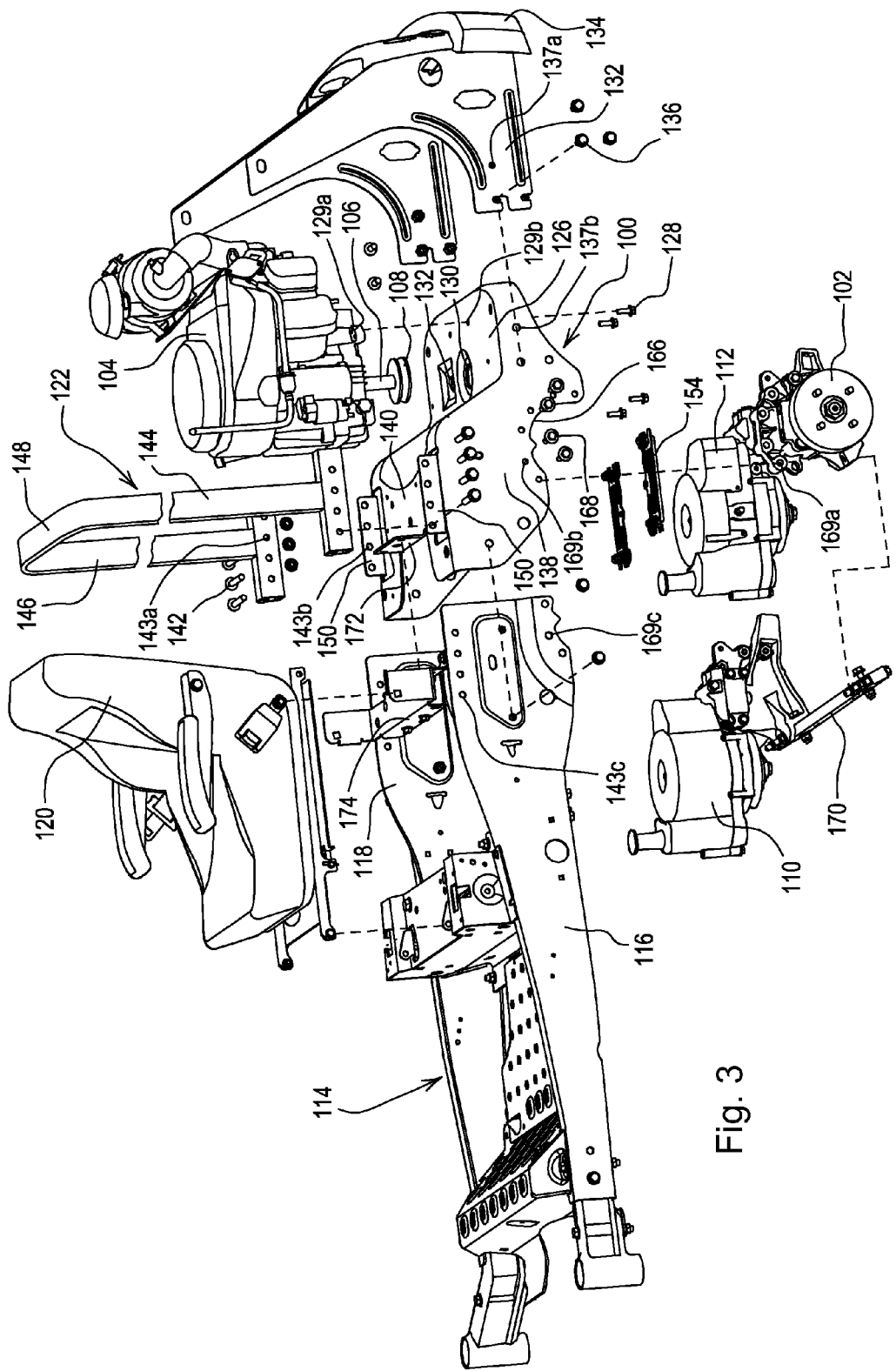
FIG. 3 is an exploded perspective view of an engine, a pair of hydrostatic transmissions, and roll over protection system, with the unitary rear frame of FIG. 1.

As shown in FIGS. 1-3, unitary rear frame 100 may be provided for a grass mowing machine such as a zero turning radius ("ZTR") mower. The mower may have at least one drive wheel 102 on each side that is powered to rotate independently of the other drive wheel. Engine 104 may have a crankshaft 106 with a drive pulley 108 engaging an endless belt that also engages driven pulleys for hydrostatic transmissions 110, 112. Each hydrostatic transmission may include a pump with a driven pulley, a swash plate defining a pump stroke between neutral, reverse and forward positions, and a motor coupled to the wheel.

In one embodiment, the mower may have a front frame 114 with left and right longitudinal members 116, 118, supported on a forward end by front wheels, and suspending a mower deck between the front and rear wheels. Engine 104 may be mounted to unitary rear frame 100 located behind and under operator seat 120. A seated operator may use left and right control arms, or other steering controls, to control the pair of hydrostatic transmissions 110, 112 driving the left and right wheels.

In one embodiment, unitary rear frame 100 may be manufactured by stamping a sheet metal blank. For example, unitary rear frame 100 may be stamped from 7 gauge sheet steel in a two step deep drawing process, followed by trimming it to the desired shape. The unitary rear frame of the present invention does not require any welds. Engine 104, left and right hydrostatic transmissions 110, 112 and other components, such as roll over protection system ("ROPS") 122, may be mounted to the unitary rear frame 100 to form an unwelded rear frame assembly 124. Manufacture of the rear frame assembly 124 may be done without welding, and there is no need to turn over or re-orient the rear frame assembly during assembly.

In one embodiment, unitary rear frame 100 includes lower mounting surface 126 where engine 104 may be supported and mounted with threaded fasteners 128 inserted through mating holes 129a, 129b in the engine flange and lower mounting surface. Lower mounting surface 126 may be a generally horizontal sheet metal plate at the rear of unitary rear frame 100. Engine 104 may be an internal combustion engine having a vertical crankshaft 106 extending down through crankshaft opening 130 in lower mounting surface 126. An oil drain tube from engine 104 may be located at opening 132 in lower mounting surface 126. Bumper bracket 132 and bumper 134 may be mounted with threaded fasteners 136 in mating holes 137a, 137b in the bumper bracket and side panels 138.

In one embodiment, unitary rear frame 100 may include upper mounting surface 140 where ROPS 122 may be supported and mounted with threaded fasteners 142 inserted through mating holes 143a, 143b in the ROPS and the upper mounting surface. Upper mounting surface 140 may be a generally horizontal sheet metal plate at the front of unitary rear frame 100, above and forward of lower mounting surface 126. ROPS 122 may be an inverted U-shaped steel member including a pair of legs 144, 146 connected together by a cross bar 148. To attach the ROPS to the upper mounting surface, threaded fasteners 142 may be inserted through mating holes 143a at or near the base of each leg, and holes 143b in the upper mounting surface.

In one embodiment, upper mounting surface 140 also may include mounting tabs 150 for attaching the ROPS. Mounting tabs 150 may be integral with, and stand upright from, the upper mounting surface. Mounting tabs 150 may be manufactured by cutting slots in upper mounting surface 140 and bending each tab up at a right angle from the surface. The remaining openings 152 in the upper mounting surface may be covered by grilles or screens 154 to block debris.

In one embodiment, unitary rear frame 100 may include wall 156 between lower mounting surface 126 and upper mounting surface 140. Wall 156 may include left and right wall portions 158, 160 that lie in the same plane 162, which may be at an angle α of at least ninety degrees with respect to lower mounting surface 126, and at an angle β of at least ninety degrees with respect to upper mounting surface 140. Center portion 164 of wall 156 may be recessed forwardly of plane 162 between left and right wall portions 158, 160. Crankshaft opening 130 in lower mounting surface 126 may be rearwardly of plane 162. At least part of engine 106 may be positioned in the surface area of lower mounting surface 126 that is forward of plane 162; i.e., extending into the central recessed portion 164.

In one embodiment, unitary rear frame 100 may include a pair of opposing side panels 138. The side panels may depend downwardly and/or rearwardly from upper mounting surface 140, wall 156 and lower mounting surface 126. Each side panel 138 may include a curved or arcuate side pocket 166 where a hydrostatic transmission 110, 112 may be mounted using threaded fasteners 168 inserted through mating holes 169*a*, 169*b* in the hydrostatic transmission flange and side panel. Side pockets 166 may flare outwardly from the side panels 138. Each hydrostatic transmission 110, 112 also may be fastened to cross bar 170 which prevents or minimizes any lateral movement.

In one embodiment, unitary rear frame 100 may be attached to front frame 114 with threaded fasteners inserted through mating holes in side panels 138 of the unitary rear frame and longitudinal members 116, 118 of the front frame. Several of the same threaded fasteners that attach each hydrostatic transmission to a side panel may be inserted through mating holes 169*c* in the longitudinal members of the front frame. Threaded fasteners for mounting the ROPS also may be inserted through mating holes 143*c* in the longitudinal members of front frame. Additionally, threaded fasteners may be inserted through mating holes in tab 172 and rear seat support 174.

In one embodiment, engine 104, hydrostatic transmissions 110, 112, and other components may be assembled to unitary rear frame 100 to form a one piece rear assembly 124 without welds, before attaching the rear assembly to front frame 114. The unitary rear frame can help improve dimensional tolerances between components that have been caused by variability of welding support structures together.

Having described the preferred embodiment, it will become apparent that various modifications can be made without departing from the scope of the invention as defined in the accompanying claims.

The invention claimed is:

1. A unitary rear frame mounting an engine and hydrostatic transmissions to the rear of a ZTR mower, comprising:
   a lower mounting surface supporting the engine;
   an upper mounting surface above and forward of the lower mounting surface;
   a wall extending between the upper and lower mounting surfaces;
   a pair of integral side panels depending downwardly from the upper mounting surface and extending forwardly of the wall; each side panel having a side pocket for mounting a hydrostatic transmission thereto; and
   a recess in the wall.

2. The unitary rear frame of claim 1 further comprising left and right wall portions on each side of the recess, the left and right wall portions being in the same plane at an angle of greater than ninety degrees from each of the lower and upper mounting surfaces.

3. The unitary rear frame of claim 2 wherein the engine is mounted on the lower mounting surface such that at least part of the engine is positioned forwardly of the plane.

4. The unitary rear frame of claim 1 further comprising an engine crankshaft opening in the lower mounting surface.

5. The unitary rear frame of claim 1 further comprising a pair of roll over protection system mounting tabs upstanding from the upper mounting surface.

6. The unitary rear frame of claim 5 further comprising a roll over protection system having a pair of legs bolted to the mounting tabs.

7. A unitary rear frame mounting an engine and hydrostatic transmissions to the rear of a ZTR mower, comprising:
   a stamped sheet metal body having a plurality of horizontal mounting surfaces, side panels depending downwardly from the horizontal mounting surfaces, each of the horizontal mounting surfaces and side panels having mating holes for insertion of threaded fasteners to mount the engine and hydrostatic transmissions as an unwelded one piece rear assembly; and
   a wall extending between the plurality of horizontal mounting surfaces and having a forwardly extending recess.

8. The unitary rear frame of claim 7 wherein each side panel has a curved side pocket for mounting a hydrostatic transmission thereto.

9. The unitary rear frame of claim 7 further comprising a roll over protection system bolted to the sheet metal body.

10. The unitary rear frame of claim 7 wherein the hydrostatic transmissions are fastened to a cross bar under the unitary rear frame.

11. A unitary rear frame mounting an engine and hydrostatic transmissions to the rear of a ZTR mower, comprising:
   a one piece metal body having a first surface supporting the engine, left and right side panels supporting the hydrostatic transmissions, and a second surface supporting a roll over protection system; and
   a wall between the first and second surfaces having a recessed portion with part of the first surface extending into the recessed portion.

12. The unitary rear frame of claim 11 further comprising mounting tabs on the second surface.

13. The unitary rear frame of claim 11 wherein at least part of the wall lies in a plane at an angle greater than ninety degrees with respect to the first and second surfaces.

14. The unitary rear frame of claim 13 wherein at least part of the first surface extends forwardly of the plane.

* * * * *